United States Patent
AbiEzzi et al.

(10) Patent No.: US 10,469,562 B2
(45) Date of Patent: Nov. 5, 2019

(54) VIRTUAL MACHINE PIXEL REMOTING

(71) Applicant: VMware, Inc., Palo Alto, CA (US)

(72) Inventors: Salim AbiEzzi, Sammamish, WA (US); Jeffrey R. Glasson, Hillsborough, CA (US)

(73) Assignee: VMware, Inc., Palo Alto, CA (US)

( * ) Notice: Subject to any disclaimer, the term of this patent is extended or adjusted under 35 U.S.C. 154(b) by 399 days.

(21) Appl. No.: 15/191,927

(22) Filed: Jun. 24, 2016

(65) Prior Publication Data

US 2017/0374130 A1 Dec. 28, 2017

(51) Int. Cl.
| | | |
|---|---|---|
| *H04L 29/08* | (2006.01) | |
| *G06F 3/14* | (2006.01) | |
| *G06F 9/455* | (2018.01) | |
| *G06F 9/451* | (2018.01) | |
| *H04L 29/06* | (2006.01) | |

(52) U.S. Cl.
CPC ......... *H04L 67/025* (2013.01); *G06F 3/14* (2013.01); *G06F 9/452* (2018.02); *G06F 9/45533* (2013.01); *G09G 2358/00* (2013.01); *G09G 2370/022* (2013.01); *H04L 67/38* (2013.01)

(58) Field of Classification Search
None
See application file for complete search history.

(56) References Cited

U.S. PATENT DOCUMENTS

| | | |
|---|---|---|
| 7,149,776 B1 | 12/2006 | Roy |
| 8,473,958 B2 | 6/2013 | Kamay et al. |
| 8,924,862 B1 | 12/2014 | Luo |
| 9,158,434 B2 | 10/2015 | Beveridge |

(Continued)

FOREIGN PATENT DOCUMENTS

| | | |
|---|---|---|
| JP | 2005-075314 | 3/2005 |
| JP | 2010-026104 | 2/2010 |

(Continued)

OTHER PUBLICATIONS

*Device Driver.* Wikipedia, The Free Encyclopedia. Last updated Mar. 29, 2016. Retrieved Apr. 5, 2016. Retrieved from the Internet: URL<https://en.wikipedia.org/wiki/Device_driver>. 7 pages.

(Continued)

*Primary Examiner* — Wynuel S Aquino
*Assistant Examiner* — Melissa A Headly
(74) *Attorney, Agent, or Firm* — Fish & Richardson P.C.

(57) ABSTRACT

Methods, systems, and apparatus, including computer programs encoded on computer storage media, for changing virtual machine user interfaces. One of the methods includes detecting, for a remote session, a first resolution for a content presentation area in a web browser, generating, using the first resolution, a first stream of pixels representative of a user interface, providing the first stream of pixels for display in the web browser, receiving input indicating a change to a resolution of the content presentation area in the web browser, detecting a second resolution for the content presentation area in the web browser, generating, using the second resolution, a second stream of pixels representative of the user interface, and providing the second stream of pixels for display in the web browser by the client device.

20 Claims, 3 Drawing Sheets

(56) References Cited

U.S. PATENT DOCUMENTS

| | | |
|---|---|---|
| 9,167,020 B2 | 10/2015 | Abdo |
| 9,295,915 B2 | 3/2016 | Bruno, Jr. et al. |
| 9,565,227 B1 | 2/2017 | Helier |
| 9,628,332 B2 | 4/2017 | Bruno, Jr. |
| 2004/0010622 A1 | 1/2004 | O'Neill |
| 2006/0075106 A1 | 4/2006 | Hochmuth |
| 2007/0208808 A1 | 9/2007 | Rust |
| 2009/0112808 A1 | 4/2009 | Howcroft |
| 2009/0235177 A1 | 9/2009 | Saul et al. |
| 2010/0106798 A1 | 4/2010 | Barreto et al. |
| 2010/0135296 A1 | 6/2010 | Hwang |
| 2010/0169790 A1 | 7/2010 | Vaughan |
| 2010/0269046 A1 | 10/2010 | Pahlavan |
| 2010/0306642 A1 | 12/2010 | Lowet |
| 2011/0138295 A1 | 6/2011 | Monnchilov |
| 2011/0246891 A1 | 10/2011 | Schubert |
| 2011/0295974 A1 | 12/2011 | Kashef |
| 2012/0204093 A1 | 8/2012 | Habarakada |
| 2012/0324358 A1 | 12/2012 | Jooste |
| 2013/0290856 A1 | 10/2013 | Beveridge |
| 2013/0290858 A1 | 10/2013 | Beveridge |
| 2013/0346564 A1 | 12/2013 | Warrick |
| 2014/0026057 A1 | 1/2014 | Kimpton |
| 2014/0215457 A1 | 7/2014 | Gava |
| 2014/0258872 A1 | 9/2014 | Spracklen |
| 2014/0325374 A1 | 10/2014 | Dabrowski |
| 2014/0344332 A1 | 11/2014 | Giebler et al. |
| 2014/0355189 A1 | 12/2014 | Nakano |
| 2015/0062183 A1 | 3/2015 | Hong |
| 2015/0089426 A1 | 3/2015 | Ukai |
| 2015/0134840 A1 | 5/2015 | Thompson et al. |
| 2015/0172760 A1 | 6/2015 | AbiEzzi et al. |
| 2015/0199308 A1 | 7/2015 | Cooper |
| 2016/0191604 A1 | 6/2016 | AbiEzzi et al. |
| 2016/0219084 A1 | 7/2016 | AbiEzzi |
| 2016/0248838 A1 | 8/2016 | AbiEzzi et al. |
| 2016/0249006 A1* | 8/2016 | Park .................. H04N 5/44543 |
| 2016/0283070 A1 | 9/2016 | AbiEzzi |
| 2016/0285956 A1 | 9/2016 | AbiEzzii |
| 2017/0185438 A1* | 6/2017 | Thomas .................. G06F 8/61 |
| 2017/0300966 A1 | 10/2017 | Dereszynski |

FOREIGN PATENT DOCUMENTS

| | | |
|---|---|---|
| JP | 2010-126092 | 6/2010 |
| JP | 5994659 | 9/2016 |
| WO | WO 2013/168368 | 11/2013 |

OTHER PUBLICATIONS

*Write Once, Run Anywhere.* Wikipedia, The Free Encyclopedia. Last updated Nov. 20, 2015. Retrieved Apr. 5, 2016. Retrieved from the Internet: URL<https://en.wikipedia.org/wiki/Write_once,_run_anywhere>. 2 pages.

Gear, David Pierce. *Surface Book is the Laptop Microsoft Needed Years Ago.* WIRED. Published Oct. 6, 2015. Retrieved Feb. 5, 2016. Retrieved from the Internet: URL<http://www.wired.com/2015/10/surface-book-future-of-windows/>. 10 pages.

Massey, Sean P. *Horizon View 5.3 Part 13—VMware Blast.* The Virtual Horizon. Publication Feb. 25, 2014. Retrieved Feb. 5, 2016. Retrieved from the Internet: URL<https://thevirtualhorizon.com/2014/02/25/horizon-view-5-3-part-13-vmware-blast/>. 9 pages.

U.S. Appl. No. 15/172,946, filed Jun. 3, 2016, AbiEzzi et al.

International Search Report and Written Opinion in International Application No. PCT/JP2013/002600, dated Jun. 11, 2013, 17 pages (English Translation).

* cited by examiner

VIRTUAL MACHINE PIXEL REMOTING

BACKGROUND

This specification relates to virtual machines.

A virtual machine is a software-based abstraction of a physical computer system. In general, any computer program that can be executed on a physical computer system can be executed in a virtual machine using virtualization software. Virtualization software is software that is logically interposed and interfaces with a virtual machine and a physical computer system. Each virtual machine is configured to execute an operating system (OS), referred to herein as a guest OS, and applications. A physical computer system, referred to herein as a host machine, can execute one or more virtual machines. A host system may include one or more host machines, e.g., servers.

A virtual machine can be accessed remotely through a network connection. For example, it is possible to use a remote client to access a virtual machine remotely. A remote client is a program that communicates user interface information with a remote system. Generally, the user interface information includes display data, which is received from the remote system and displayed locally to the user on a client device, and the remote client sends inputs generated by the user to the remote system. In this way, applications executing remotely from the client device can be accessed and interacted with by the user.

SUMMARY

A host system may receive a request to access an application from a client device. For instance, the host system may receive a request that indicates that the client device wants to create a session with a virtual machine to access an application executing on the virtual machine, data available from the virtual machine, or both.

In some implementations, the host system may execute a workspace service, e.g., an application aggregation service. The workspace service may perform user authentication, application selection or application authorization or both, session initiation, or a combination of two or more of these. The workspace service may determine applications available to the client device, e.g., based on authentication of a user account for the client device which indicates the applications available to the client device.

The host system generates pixels for a user interface of the application and streams the pixels to the client device to allow a remote session for the application to move between multiple different client devices, to provide increased security, or both. For instance, a host system, e.g., the workspace service, may receive identification of user credentials from a web browser executing on a first device, authenticate the user credentials, and select an application authorized by the user credentials. The host system determines a size of a canvas area in the web browser, generates a user interface for the virtual machine session using the canvas size, and provides pixel information for the user interface to the web browser to cause the web browser to present the user interface for the application as part of a web page presented in the web browser and on a display of the first device, e.g., using a canvas tag.

In some implementations, the host system receives data indicating a request to resize the canvas area of the web browser, e.g., the web browser window, a web page, or both. In response, the host system determines an updated size of the canvas area and updates the user interface using the updated size. The host system generates pixel information for the updated user interface and provides the pixel information to the first device, e.g., for presentation in the web browser.

The host system may receive another request for a session with the application for the user credentials from a second device, e.g., from a web browser executing on the second device or another application executing on the second device, and authenticates the user credentials. In response to the authentication, the host system determines a second size of a second canvas area for the second device, updates the user interface using the second canvas size, and generates pixel information for the updated user interface. The host system provides the pixel information for the updated user interface to the second device to cause the presentation of the updated user interface on a display of the second device.

The host system may provide the pixel information for an application session to a device to allow the device to create a connection with a virtual machine session when the device does not include virtual machine software to run a remote client and is able to present pixel information on a display, e.g., in a web browser or using another application. For instance, the pixel information may be an h.264 video stream and the host system provides the h.264 video stream to any device that can present h.264 content to allow the device to present information from a virtual machine session.

The host system dynamically adjusts the presentation and input options for a virtual machine based on the type of device, e.g., a display or presentation format for the device, and input features available to the device which will receive the pixel information. For instance, a user may cause a web browser on the first device, e.g., a smart phone, to connect to the virtual machine and then cause a web browser on the second device, e.g., a desktop computer, to connect to the virtual machine to view the same application, with the user interface for the application customized according to the type of device on which the application is presented, e.g., while the host system executes the same application for the virtual machine whether the application is presented on the first device or the second device.

In general, one innovative aspect of the subject matter described in this specification can be embodied in methods that include the actions of receiving a request from a client device to initiate a remote session that allows a user to remotely interact with one or more applications executing on a virtual machine by viewing display data for the one or more applications in a web browser executing on the client device, detecting, for the remote session, a first resolution for a content presentation area in the web browser in response to receiving the request to initiate the remote session that allows the user to remotely interact with the one or more applications executing on the virtual machine by viewing display data for the one or more applications in a web browser executing on the client device, generating, for the remote session and using the first resolution, a first stream of pixels representative of a user interface for one of the one or more applications for presentation in the content presentation area in the web browser in response to detecting, for the remote session, the first resolution for the content presentation area in the web browser, providing, during the remote session and to the client device, the first stream of pixels for display in the web browser by the client device, receiving, for the remote session, input indicating a change to a resolution of the content presentation area in the web browser, detecting, for the remote session, a second resolution for the content presentation area in the web browser of the client device in response to receiving the input indicating the change to a resolution of the content presentation area in the web browser, generating, for the remote session and using the second resolution, a second stream of pixels representative of the user interface for the one of the one or more applications for presentation in the content presentation area in the web browser in response to detecting, for the remote session, the second resolution for the content presentation area in the web browser, and providing, during the remote session and to the client device, the second stream of pixels for display in the web browser by the client device. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of receiving a first request to initiate a first remote session for a first client device that allows a user to remotely interact with one or more applications executing on a virtual machine, determining that the first client device does not include a remote client, detecting, for the first remote session, a first resolution for a content presentation area on a display for the first client device in response to receiving the first request to initiate the first remote session that allows the user to remotely interact with the one or more applications executing on the virtual machine, generating, for the first remote session and using the first resolution, a first stream of pixels representative of a user interface for one of the one or more applications for presentation in the content presentation area of the first client device in response to determining that the first client device does not include a remote client, providing, during the first remote session and to the first client device, the first stream of pixels for display by the first client device in the content presentation area, detecting an end of the first remote session with the first client device, detecting, for a second remote session for a second client device that allows the user to remotely interact with the one or more applications executing on the virtual machine, a second resolution for a second content presentation area in a web browser executing on the second client device, generating, for the second remote session and using the second resolution, a second stream of pixels representative of the user interface for one of the one or more applications for presentation in the second content presentation area in the web browser in response to detecting, for the second remote session, the second resolution for the second content presentation area in the web browser executing on the second client device, and providing, during the second remote session and to the second client device, the second stream of pixels for display in the web browser by the second client device. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination. The method may include initiating the remote session with the client device, and determining, during the remote session, that the client device does not include a remote client, wherein generating, for the remote session and using the first resolution, the first stream of pixels representative of the user interface for the one of the one or more applications for presentation in the content presentation area in the web browser is responsive to determining that the client device does not include a remote client. The method may include configuring, for the remote session, settings for a virtual display device for the virtual machine to be a display device having the first resolution. Generating, for the remote session and using the first resolution, the first stream of pixels representative of the user interface for one of the one or more applications for presentation in the content presentation area in the web browser may include generating, for the remote session and using the settings for the virtual display device, the first stream of pixels representative of the user interface for one of the one or more applications for presentation in the content presentation area in the web browser. The method may include detecting, for the remote session, one or more input properties for an input device of the client device in response to receiving the request to initiate the remote session that allows the user to remotely interact with the one or more applications executing on the virtual machine by viewing display data for the one or more applications in a web browser executing on the client device, and configuring, for the remote session, settings for a virtual input device for the virtual machine to be an input device having the one or more input properties for the input device. Generating, for the remote session and using the first resolution, the first stream of pixels representative of the user interface for one of the one or more applications for presentation in the content presentation area in the web browser may include generating, for the remote session and using the settings for the virtual input device, the first stream of pixels representative of the user interface for one of the one or more applications for presentation in the content presentation area in the web browser.

In some implementations, the method may include receiving, from the web browser, data representing user input for the user interface of the one of the applications, and providing, to the one of the applications, the data representing the user input. Receiving the data representing the user input for the user interface of the one of the applications may include receiving data using an application programming interface. Receiving the data representing the user input for the user interface of the one of the applications may include receiving data representing a string of input for the user interface of the one of the applications. Receiving the data representing the user input for the user interface of the one of the applications may include receiving data representing a copy and paste action that copied content outside of the presentation of the first stream of pixels on the client device and pasted the content into the presentation of the first stream of pixels.

In some implementations, the method may include configuring, for the first remote session, settings for a virtual display device for the virtual machine to be a display device having the first resolution, initiating the first remote session with the first client device in response to receiving the first request to initiate the first remote session for the first client device, and configuring, for the second remote session, updated settings for the virtual display device for the virtual machine to be a display device having the second resolution. Generating, for the first remote session and using the first resolution, a first stream of pixels representative of a user interface for one of the one or more applications for presentation in the content presentation area of the first client device may include generating the first stream of pixels using the settings for the virtual display device. Providing, during the first remote session and to the first client device, the first stream of pixels for display by the first client device in the content presentation area may be responsive to initiating the first remote session with the first client device. Generating, for the second remote session and using the second resolution, the second stream of pixels representative of the user interface for one of the one or more applications for presentation in the second content presentation area in the web browser may include generating the second stream of pixels using the updated settings for the virtual display device.

In some implementations, the method may include detecting, for the first remote session, one or more first input properties for a first input device of the first client device, configuring, for the first remote session, settings for a virtual input device for the virtual machine to be an input device having the one or more first input properties for the first input device of the first client device, initiating the first remote session with the first client device in response to receiving the first request to initiate the first remote session for the first client device, detecting, for the second remote session, one or more second input properties for a second input device of the second client device, and configuring, for the second remote session, updated settings for the virtual input device for the virtual machine to be an input device having the one or more second input properties for the second input device of the second client device. Generating, for the first remote session and using the first resolution, a first stream of pixels representative of a user interface for one of the one or more applications for presentation in the content presentation area of the first client device may include generating the first stream of pixels using the settings for the virtual input device. Providing, during the first remote session and to the first client device, the first stream of pixels for display by the first client device in the content presentation area may be responsive to initiating the first remote session with the first client device. Generating, for the second remote session and using the second resolution, the second stream of pixels representative of the user interface for one of the one or more applications for presentation in the second content presentation area in the web browser may include generating the second stream of pixels using the updated settings for the virtual input device.

In some implementations, one or more computers may perform the method described above. The one or more computers may include a server operable to interact with the device through a data communication network. Goth the first client device and the second client device may be configured to interact with the server as a client. The first client device may include a mobile telephone or a tablet. The second client device might not include a web browser or a remote client.

The subject matter described in this specification can be implemented in particular embodiments and may result in one or more of the following advantages. In some implementations, the systems and methods described below may allow different types of devices to create a new application session, e.g., with a virtual machine, so that the virtual machine automatically adapts a presentation of a user interface from one session to a subsequent session by changing presentation settings for the virtual machine. In some implementations, the systems and methods described below may provide improved performance, security benefits, or both, when providing a stream of pixel information to a client device compared to other systems. In some implementations, the systems and methods described below may provide a seamless cross-device experience when resuming an application session on a different device, e.g., with different display hardware, input hardware, or both. In some implementations, the systems and methods described below may simplify cross device application development by allowing development of a single application that is stored and executed at a central location, e.g., on a host system executing a virtual machine, when a user interface for the single application is presented on different devices. In some implementations, the systems and methods described below may cause presentation of an application on a device, e.g., in a web page on a web browser, without requiring local execution of the application on the device. In some implementations, the systems and methods described below may provide web developers with remote application execution as part of a web page without the added security and performance challenges that local execution methods involve. For instance, the systems described below may include a tool, e.g., an application programming interface, that allows web developers to include presentation of content for an application that is executing remotely from an end user device when the content is included as part of a web page that a web developer can use in combination with traditional web tools, e.g., so that the web developer may create richer web applications.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
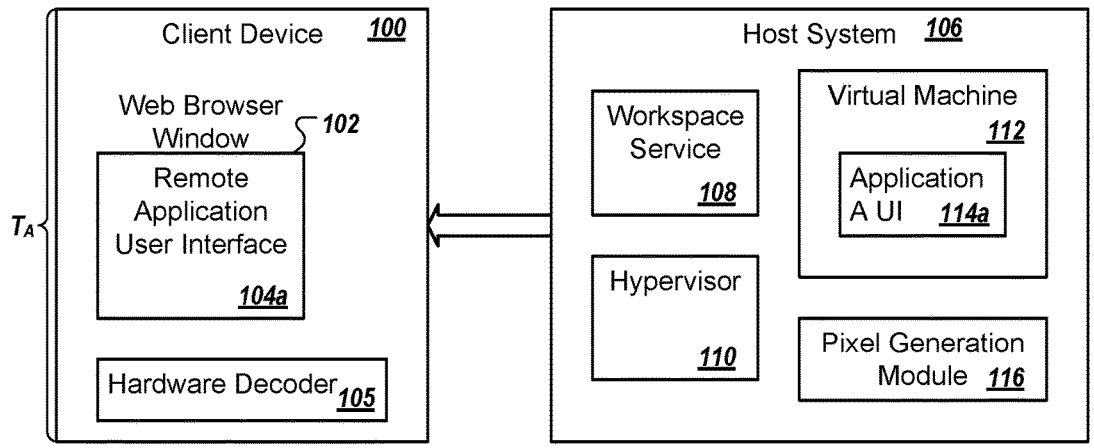
FIGS. 1A-C show an example of an environment in which a host system provides a stream of pixel information for a remote application user interface to a client device.

A host system, e.g., a workspace service, a hypervisor, or both, may cause an application to dynamically change a presentation of a user interface of the application. For example, the host system may provide a stream of pixels to a client device that represent a user interface of the application. When the host system detects a change in a presentation format, e.g., a display resolution, a display orientation, or both, and the host system updates the user interface of the application and provides a stream of pixels that represent the updated user interface to the client device in response to the change of the presentation format. The change of the presentation format may be a resize of a window in which content for the application is presented, e.g., a web browser window or an embedded application window, or a change of devices that presents content for the application.

For example, the host system may execute an application on a virtual machine when the application provides a user interface that provides access to a large volume of data, such as computer-aided draft (CAD) files or a photo archive. The host system generates a stream of pixels for the user interface and provides the stream of pixels to a client device, e.g., instead of the data files for the application. In some examples, the host system may provide the stream of pixels, e.g., an h.264 stream, to a web browser, e.g., using canvas tags. The web browser may provide the pixel stream to a hardware decoder on the client device to cause presentation of the pixel stream on a display.

The pixel based remoted user interface may provide the client device with full flexibility to navigate, view, and edit the application data that is stored on the host, e.g., by providing messages to the host system that indicate user input. For instance, the host system receives user input events for the application and provides the user input events to the application. The application, in response, updates the user interface which causes an update to the stream of pixels provided to the client device.

In some examples, the host system authenticates a session at the web page level, e.g., in response to a request for an application associated with a particular uniform resource locator (URL). During session initiation, the host system, e.g., a workspace service, may determine display parameters, canvas parameters, or both, for the presentation of the pixel stream on the client device and provide the parameters to the application, the virtual machine, or both. The host system continues to monitor the display parameters, the canvas parameters, or both, during the session and provides updated parameters to the application, the virtual machine, or both, if the parameters change, e.g., if the web page or web browser is resized, which may cause the application to adapt its user interface resolution, layout, or both, in response. The host system may cause the application to adapt to varying input styles, e.g., when the device connecting to the host system and presenting the content in a web browser changes from a laptop with a touchpad to a phone with a touch screen.

In some implementations, an application is launched on the host system, e.g., on a server, in response to a web page loading on a client device. For instance, when the host system receives data indicating the client device requesting the web page, the host system launches the application to cause the application to present content as part of the web page. When the web page has loaded, the web page displays an initial user interface for the application. The host system may restart or resume the application in response to the client device revisiting or reloading the web page.

Figure 1B:
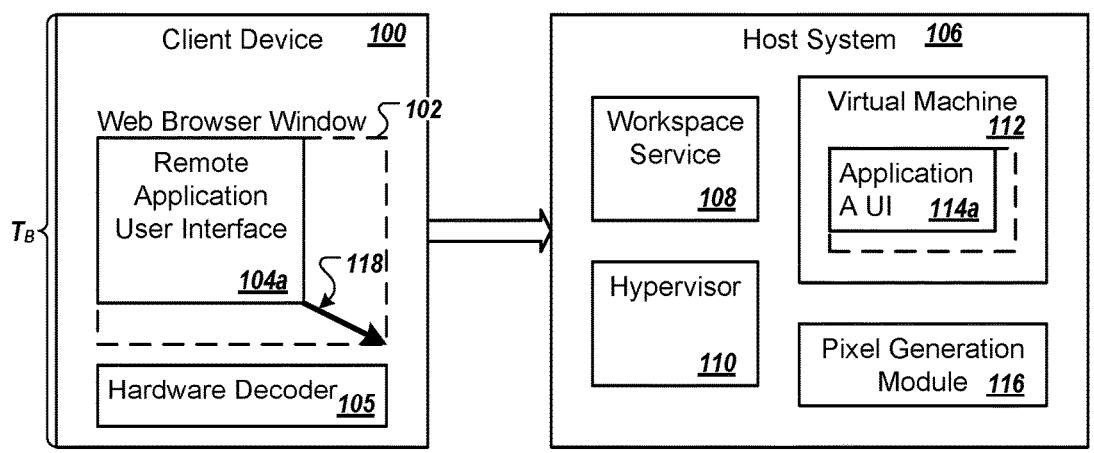
Figure 1C:
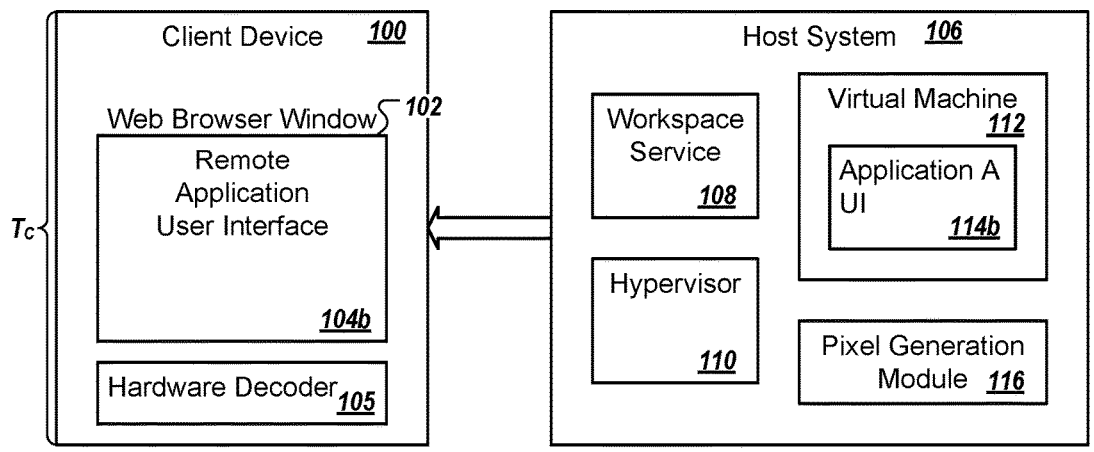

FIGS. 1A-C show an example of an environment in which a host system 106 provides a stream of pixel information for a remote application user interface 114 to a client device 100. The host system 106 may include one or more physical computers that execute the remote application, in addition to other applications, e.g., a workspace service 108 and a hypervisor 110.

The host system 106 may include a workspace service 108. The workspace service 108 may perform user authentication, application selection or application authorization or both, session initiation, or a combination of two or more of these. For instance, the workspace service 108 may, prior to time window $T_A$, receive a request from the client device 100 for a session with a particular application, e.g., an application A. The workspace service 108 authorizes the session using credentials received from the client device 100. The workspace service 108 may receive the credentials with the request for the session with the application A or at another time, e.g., in response to a request for the credentials sent to the client device 100 by the host system 106.

After authorization of the client device 100, the workspace service 108 notifies a hypervisor 110, included in the host system 106, of the request for the session with the application A. The hypervisor 110 causes the execution of virtual machines, including a virtual machine 112, on the host system 106 and monitors the execution of the virtual machines on the host system 106. For instance, in response to the notification from the workspace service 108, the hypervisor 110 causes the execution of the virtual machine 112 and the execution of an application A on the virtual machine 112.

The host system 106, e.g., the workspace service 108, may determine that the client device 100 will present content for the application A in a web browser window 102, e.g., of a web browser executing on the client device 100, or that the client device 100 does not include a remote client for connection to the virtual machine, e.g., and that the client device 100 includes a hardware decoder 105 that can decode a stream of pixels for display on the client device 100. The host system 106 generates, for a first user interface 114a of the application A, a stream of pixel information and provides the stream of pixel information to the client device 100, at time window $T_A$ shown in FIG. 1A, for presentation of a remote application user interface 104a, e.g., the first user interface 114a of the application A, in the web browser window 102. For instance, a pixel generation module 116 receives data for the first user interface 114a of the application A from the virtual machine 112 and generates the stream of pixel information. The host system 106, e.g., the pixel generation module 116, may include HTML information with the stream of pixel information when the virtual machine session will be presented in the web browser window 102 on the client device 100.

At time window $T_B$, shown in FIG. 1B, the host system 106 receives data from the client device 100 indicating a change 118 in the size of the web browser window 102. For example, the host system 106 may receive data that indicates a display resolution for the web browser window 102 and determine that the display resolution is different from a first display resolution for the web browser window during the time window $T_A$.

In response, the host system 106 changes presentation parameters for the application A executing on the virtual machine 112. For instance, the host system 106, e.g., the hypervisor 110, the virtual machine 112, or both, cause the application A to change a presentation of the first user interface 114a for the application A to a second user interface 114b, e.g., with a different resolution, shown in FIG. 1C. In some implementations, the host system 106 may send a message to the application A that indicates data, e.g., that identifies presentation parameters, for the change to the presentation of the first user interface 114a. The application A uses the data to generate the second user interface 114b. The second user interface 114b may be based on the same content as the first user interface 114a but presented in a different manner, e.g., specific to the changed presentation parameters. For instance, the second user interface 114b may present the same menu or content as the first user interface 114a but in a different manner, e.g., based on the change 118 to the size of the web browser window 102.

In some implementations, the host system 106 may provide application A a message that indicates that the application A should change the user interface from the first user interface 114a to the second user interface 114b. The message may include the presentation parameters for the second user interface 114b. The application A may determine the presentation parameters identified in the message and use the presentation parameters to change the application A's user interface.

In some implementations, the host system 106 may change a driver for a virtual display device on the virtual machine 112 to cause the application A to change the presentation of the first user interface 114a to the second user interface 114b. Some example of systems that use a driver to change presentation content are described in U.S. application Ser. No. 15/172,946, filed on Jun. 3, 2016, titled "Virtual Machine Content Presentation."

The virtual machine 112 provides data for the second user interface 114b of the application A to the pixel generation module 116. The pixel generation module 116 uses the data for the second user interface 114b to generate a second stream of pixels that represent the content of the second user interface 114b. At time window $T_C$, the host system 106 provides the second stream of pixels to the client device 100.

The client device 100 uses the second stream of pixels to present, in the web browser window 102, an updated user interface 104b for the remote application, e.g., the application A. In some examples, the client device 100 uses the hardware decoder 105 to present the stream of pixels on a display for the client device 100, e.g., with or without presenting the content in a web browser.

The host system 106 may detect a change in size of an active window on the client device 100, e.g., the web browser window 102, which presents the user interface for the application A and, in response, change presentation properties for the virtual machine 112, the application A, or both. For instance, the host system 106 may determine that an active window for presentation of the user interface is 1280 by 720. In response, the host system 106 configures the application A to have the first user interface that is 1280 by 720 pixels.

At time window $T_B$, when the host system 106 determines that the size of the active window 102 has changed, e.g., to 1600 by 900 or 1024 by 768, the host system 106 uses the size of the web browser window 102 to change settings of the virtual machine 112. For example, the host system 106 causes the virtual machine 112, and applications executing on the virtual machine, to generate instructions for presentation of a user interface using the new resolution of the web browser window 102.

In some implementations, a client device, an application executing on the client device, or both, may provide data to the virtual machine 208, the remote application, e.g., the application A, or both. For instance, when a size of a web browser, executing on the client device, changes, the web browser provides parameters to the remote application that indicate the new size of the web browser window. The size may represent pixel region dimensions for the web browser window.

In some examples, the web browser may provide access to a physics simulation or a chemistry simulation. The remote application may execute the actual simulation, e.g., since the simulation may be computationally complex and expensive, and provides a pixel stream to the web browser for presentation of the simulation, e.g., in an area on a web page presented in the web browser.

The web browser may receive user input indicating parameters for the simulation, such as a three-dimensional view point for the simulation, experiment parameters for the simulation, or both. The web page that includes the presentation of the pixel stream of the simulation may include a form that accepts the user input for the simulation parameters, e.g., the view point, a temperature setting, a pressure setting, or a combination of two or more of these.

In response to receipt of the simulation parameters, the web browser provides the simulation parameters to the remote application to cause the remote application to change the simulation accordingly. The remote application, executing on the host system 202 receives the simulation parameters and updates the simulation using the simulation parameters. For instance, the remote application may receive an attribute-value pair from the client device through a virtual channel that is part of a user interface remoting protocol. The attribute-value pair may include an attribute identifier, e.g., a numerical identifier for the phrase "temperature" or the label "temperature," and a corresponding value for the attribute. The host system 202 may receive a packet from the client device that includes the attribute-value pair and provide data from the packet, e.g., data representing the attribute-value pair, to the remote application, the virtual machine 208, or both.

The remote application may receive any appropriate type of data representing user input from the client device. For instance, the host system 208 may include an application programming interface (API) that allows the client device, the web browser, or both, to provide user input to the remote application. The remote application may receive a list of serialized attribute-value pairs expressed as a text string generated by the web browser.

In some examples, the remote application may receive data from the web browser, the client device, or both, representing content that was copied and pasted into the interface of the remote application presented by the client device. For instance, when the web browser determines that content was pasted into a canvas of the remote application user interface, presented on the client device, the web browser sends the content to the remote application using a virtual channel, e.g., that is part of a user interface remoting protocol. The copy and pasted content may be text, an image, or any other appropriate type of content.

Figure 2:
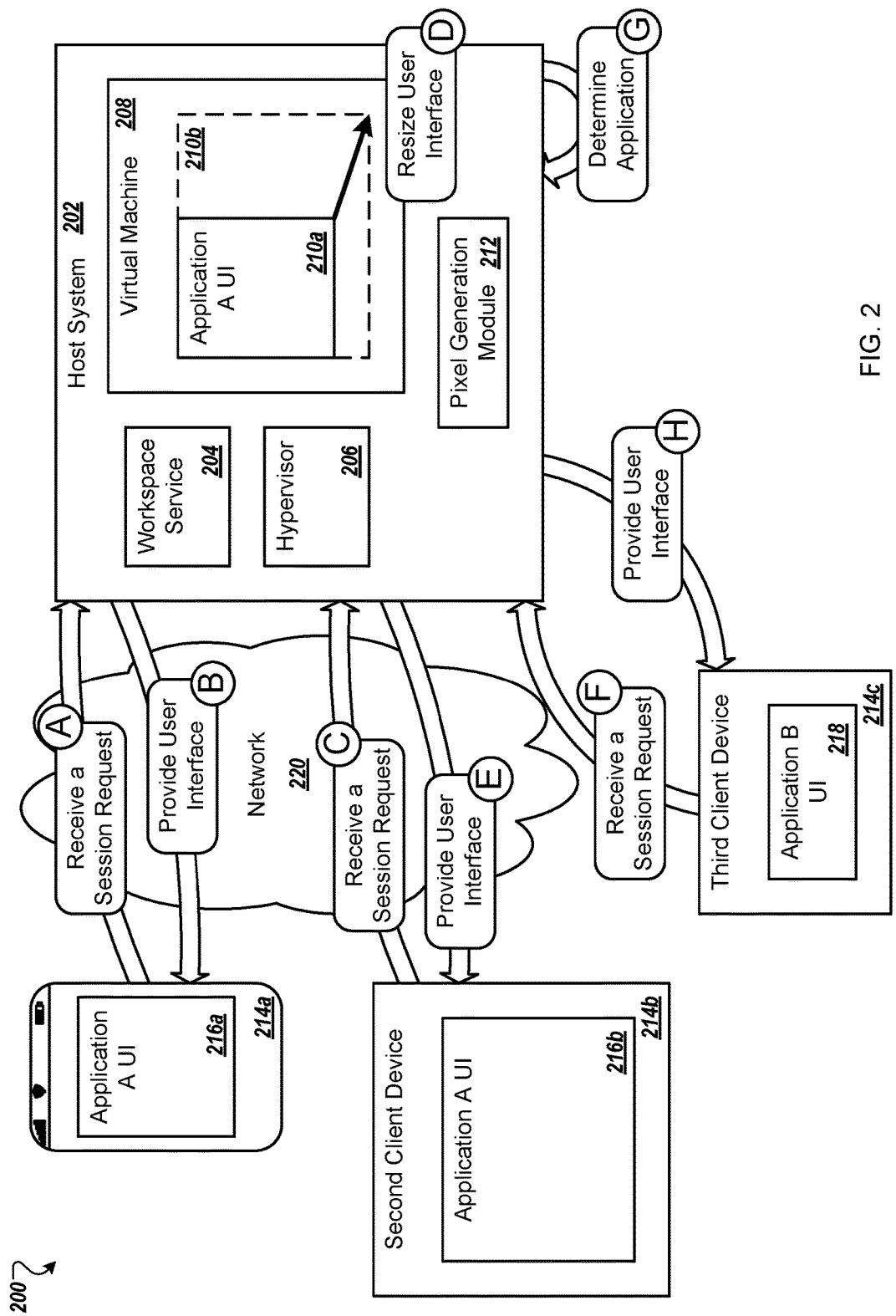
FIG. 2 is an example of an environment of a host system providing streams of pixel information for remote application user interfaces to multiple different client devices.

FIG. 2 is an example of an environment 200 of a host system 202 providing streams of pixel information for remote application user interfaces to multiple different client devices 214a-c. For example, the host system 202, at time window $T_A$, receives a request from a first client device 214a for a session with an application A. A workspace service 204 may receive the request, authenticate the request, and initialize a session with the first client device 214a.

The host system 202, e.g., a hypervisor 206, uses the request from the first client device 214a to execute a virtual machine 208. For instance, the hypervisor 206 causes execution of the virtual machine 208 with the application A. The virtual machine 208 executes the application A to cause the application A to generate a first user interface 210a.

A pixel generation module 212 receives data from the virtual machine 208 and uses the data to generate pixel information, e.g., a stream of pixels or a stream of images, for the first user interface 210a. The pixel generation module

212, via the host system 202, provides the pixel information for the first user interface 210*a* to the first client device 214*a* at time window $T_B$.

The first client device 214*a* receives the pixel information from the host system and uses the pixel information to present the first user interface 216*a* for the application A on a display included in the first client device 214*a*. For instance, the first client device 214*a* may provide the pixel information to a hardware decoder, included in the first client device 214*a*, or a web browser, executing on the first client device 214*a*, or both a hardware decoder and a web browser, to present the first user interface 216*a* on the display. In some examples, the first client device may provide the pixel information to the web browser and the web browser provides the pixel information to the hardware decoder to cause presentation of the user interface on a display, e.g., such that the user interface is presented as part of the web browser window.

The host system 202, e.g., the workspace service 204, may use one or more remoting protocols to create a session with the first client device 214*a*. The host system 202 uses the session, and appropriate remoting protocols, to send the instructions for the presentation of the first user interface 210*a* to the first client device 214*a*. In some examples, the host system 202 may create the session for the virtual machine 208 with an application installed on the first client device 214*a*, e.g., a web browser.

At time window $T_C$, the host system 202 receives a second request for a session with the application A from a second client device 214*b*. The host system 202, e.g., the workspace service 204, determines that the second client device 214*b* is associated with the same credentials as the first client device 214*a*. For example, the workspace service 204 determines that the credentials received for the first request for a session with the application A, at time window $T_A$, are the same as the credentials received for the second request, at time window $T_C$. In some examples, the workspace service 204 may determine that the credentials for the first request and the credentials for the second request are associated with the same user account.

The host system 202 determines presentation properties of the second client device 214*b* and, at time window $T_D$, causes the application A to resize the first user interface 210*a* for the application A to generate a second user interface 210*b* for the application A. For instance, the workspace service 204 receives data indicating canvas parameters or a resolution for the second client device 214*b* and provides the data to the hypervisor 206 or the virtual machine 208.

The hypervisor 206, the virtual machine 208, or both, use the data for the presentation properties to cause the application A to generate the second user interface 210*b*. For instance, the hypervisor 206, the virtual machine 208, or both, provide the application A with data that cause the application A to change the size of the user interface 210 for the application A to match the presentation properties of the second client device 214*b*.

The pixel generation module 212 uses data for the second user interface 210*b* of the application A to generate pixel information. The pixel generation module 212, via the host system 202, provides the pixel information, at time window $T_E$, to the second client device 214*b*.

In some implementations, the host system 202 may receive, at time window $T_F$, a request for a session from a third client device 214*c*. The host system 202, e.g., the workspace service 204, authenticates the third client device 214*c*, e.g., using a device identifier for the third client device 214*c*, credential information, or both. In response to authentication of the third client device 214*c*, the host system 202 may create a session with the virtual machine 208 and configure the virtual machine 208, and applications executing on the virtual machine 208, using display properties of the third client device 214*c*.

For instance, the host system 202, e.g., the virtual machine 208, may use state information to determine, at time window $T_G$, a most recent application the virtual machine 208 executed on behalf of an account for the third client device 214*c*. The host system 202 may determine that during a previous user session between the first client device 214*a* and the virtual machine 208 generated instructions for presentation of an alarm application and then generated instructions for presentation of a document editing application. The host system 202, e.g., the virtual machine 208, may determine that a third client device 214*c* requesting a current user session with the virtual machine 208 is configured to present the alarm application, an appointment reminder application, e.g., that shows calendar appointments for a particular day, and a streaming music application, e.g., but not the document editing application. The host system 202, e.g., the virtual machine 208, uses the state information to determine that, of the applications that the third client device 214*c* is configured to present, the alarm application was most recently presented during a session with the virtual machine 208. In response, the host system 202, e.g., the virtual machine 208, causes the alarm application to generate a user interface.

The pixel generation module 212 receives, from the virtual machine 208, data for the user interface of the alarm application, e.g., an application B, and generates pixel information using the data for the user interface of the alarm application. At time window $T_H$, the pixel generation module 212, via the host system 202, provides the pixel information for the alarm user interface 218, e.g., the application B user interface 218, to the third client device 214*c*.

The third client device 214*c* may include a hardware decoder that receives the pixel information from the host system 202 and generates a presentation of the user interface 218 on a display. For instance, the third client device 214*c* may include a network application that communicates with other applications executing on other network connected systems and receives the pixel information from the host system 202. The network application determines that the pixel information is for presentation on a display of the third client device 214*c* and provides the pixel information to the hardware decoder.

The host system 202 may allow another client device, such as the first client device 214*a*, access to the virtual machine 208 and the clock application. For instance, during the first user session, the host system 202 may generate instructions for presentation of a user interface or pixel information for a user interface of the clock application that is specific to the first client device 214*a*. The host system 202 provides, to the first client device 214*a*, the instructions or the pixel information for the user interface of the clock application that is specific to the first client device 214*a*.

The first client device 214*a* may present the user interface for the clock application to allow user input specifying an alarm time or other settings for the clock application, e.g., using the instructions or the pixel information. For example, the first client device 214*a* may receive user input indicating an alarm time of 8 AM.

The host system 202 receives data representing the user input and provides the data, or a portion of the data, to the virtual machine 208. The virtual machine 208 updates the clock application using the data, e.g., by providing the data to the clock application to cause the clock application to set an alarm time for 8 AM.

When the host system 202 has a session for the virtual machine 208 with the third client device 214c, the host system 202 causes the clock application to update the user interface to indicate the alarm time specified by the user input, e.g., of 8 AM. The host system 202 generates, for presentation on the third client device 214c, the user interface of the alarm application specific to the third client device 214c, e.g., specific to a display of the third client device 214c. For example, the host system 202 allows the alarm in the alarm application to be set by the first client device 214a while the third client device 214c triggers in response to determining that an alarm condition is met, e.g., that it is 8 AM. The host system 202 provides pixel information that, upon presentation by the third client device 214c, will depict the user interface of the alarm application with the alarm time specified by the user input.

In some implementations, the virtual machine 208 may adjust presentation properties of applications executing on the virtual machine 208 based on a physical location of one of the client devices 214a-c, e.g., the first client device 214a, a time of day, a day of week, whether the current day is a holiday, or a combination of two or more of these. For instance, the virtual machine 208 may cause the clock application to generate a user interface for presentation of corresponding pixel information on the third client device 214c for a predetermined period of time, e.g., from 10 PM to 8 AM. When the virtual machine 208 determines that the first client device 214a requests access to the clock application, the virtual machine 208 determines display properties of the first client device 214a and causes the clock application to generate a user interface for presentation of corresponding pixel information on the first client device 214a.

When the virtual machine 208 determines that a corresponding user or a user device has moved from one physical location to another physical location, the virtual machine 208 may cause the presentation of an application for the user or a corresponding account on a device associated with the other physical location. For instance, the host system 202 may determine that the first client device 214a is currently physically located in a kitchen and cause presentation of the clock application on the second client device 214b. When the host system 202 determines that the current time for the physical location of the first client device 214a is a predetermined time, e.g., between 10 PM and 8 AM, the host system 202 may cause presentation of the clock application on the third client device 214c.

When the host system 202 provides a pixel stream for an application to one of the client devices 214a-c, the host system 202 may allow the one of the client devices 214a-c access to other applications executing on the virtual machine 208. For instance, the host system 202 may determine that the second client device 214b may present the clock application and the appointment reminder application and allow user input that causes the host to switch between pixel streams for these applications that are provided to the second client device 214b.

The time windows $T_A$ through $T_H$ may overlap, occur in a different order, or both. For instance, the host system may receive a session request from the third client device 214c, receive a session request from the first client device 214a, and concurrently provide pixel information to both the third client device 214c and the first client device 214a, e.g., for the same application or for different applications.

The client devices 214a-c may include personal computers, mobile communication devices, and other devices that can send and receive data over a network. Some examples of the client devices 214a-c may include a laptop, a smart phone, a desktop, a tablet, or another appropriate type of device. The network 220, such as a local area network (LAN), wide area network (WAN), the Internet, or a combination thereof, connects the client devices 214a-c and the host system 202.

Figure 3:
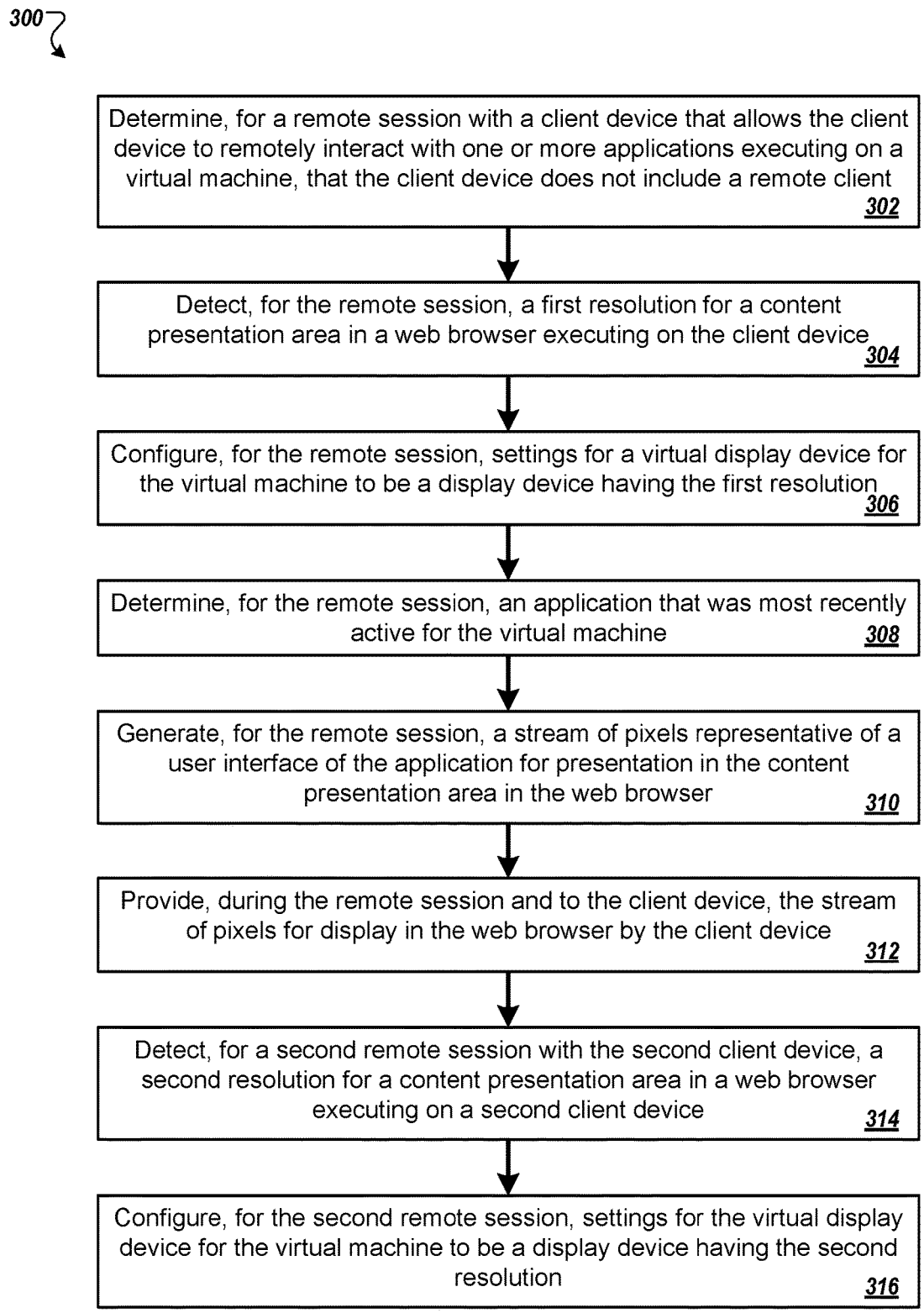
FIG. 3 is a flow diagram of a process for providing pixel information for a remote session to a client device.

FIG. 3 is a flow diagram of a process 300 for providing pixel information for a remote session to a client device. The process can be implemented by one or more computer programs installed on one or more computers. For example, the process 300 can be used by the host system 202, e.g., the hypervisor 206 or the virtual machine 208, from the environment 200.

At 302, a host system determines, for a remote session with a client device that allows the client device to remotely interact with one or more applications executing on a virtual machine, that the client device does not include a remote client to access the virtual machine. For example, the host system may receive a request for the remote session from the client device. The host system, e.g., a workspace service, may determine that the request was not received from a remote client and that the client device does not have a remote client installed and executing on the client device. The host system may determine that the request was received from the client device using a remoting protocol that indicates that the client device does not include a remote client.

At 304, the host system detects, for the remote session, a first resolution for a content presentation area in a web browser executing on the client device. For instance, the host system determines that the request included data identifying the first resolution. In some examples, the host system sends a message to the client device requesting identification of the first resolution. In response, the host system receives a message from the client device that indicates the first resolution. In some examples, the first resolution may be a resolution for a screen of the client device, a canvas area, or another appropriate area for presentation of an application user interface.

In some examples, the host system may receive a message from the client device that indicates types of applications for presentation on a display of the client device. Data representing types of applications for presentation on the display may indicate that the client device is a special purpose device for presentation of particular remote applications executed by the virtual machine, e.g., a clock application, an appointment reminder application, and a streaming music application. In some examples, data representing types of applications for presentation on the display may indicate a type of the client device and the host system uses the type of the client device to determine applications for presentation on the display of the client device.

At 306, the host system configures, for the remote session, settings for a virtual display device for the virtual machine to be a display device having the first resolution. For instance, the host system uses the first resolution to configure the virtual machine, an application executing on the virtual machine, or both.

At 308, the host system determines, for the remote session, an application that was most recently active for the virtual machine. The host system, e.g., the virtual machine, may use state information to determine, for a most recent session with the virtual machine prior to the remote session, an application that most recently presented a user interface on the virtual display device, an application for which the host system most recently generated pixel information for the user interface of the application, or both. In some examples, the host system may determine an application from the types of applications for presentation on the display of the client device that was most recently active for the virtual machine.

At 310, the host system generates, for the remote session, a stream of pixels representative of a user interface of the application for presentation in the content presentation area in the web browser. For example, the virtual machine generates the stream of pixels for the user interface using the virtual display device that emulates the first resolution of the content presentation area.

In some examples, the virtual machine generates instructions for the presentation of the user interface and provides the instructions to a virtual video card included in the virtual machine. For instance, the virtual video card may generate the stream of pixel information for the presentation of the user interface. The host system receives the stream of pixel information from the virtual video card and provides the stream of pixel information to the client device to cause the client device to present the stream of pixel information.

At 312, the host system provides, during the remote session and to the client device, the stream of pixels for display in the web browser by the client device. For instance, the host system may determine a protocol for providing h.264 to the client device and provide the stream of pixels to the client device using the determined protocol.

At 314, the host system detects, for a second remote session with a second client device, a second resolution for a content presentation area in a web browser executing on the second client device. For example, the host system determines the second resolution of a tablet or a smart phone. The host system creates a session with the virtual machine for the tablet or the smart phone and configures the virtual machine using the second resolution.

The host system generates a stream of pixels for the application specific to the second resolution. The host system provides the stream of pixels to the second client device.

The order of steps in the process 300 described above is illustrative only, and providing the pixel information for the remote session to the client device can be performed in different orders. For example, the host system may detect the resolution of the client device and then determine that the client device does not include the remote client.

At 316, the host system configures, for the second remote session, settings for the virtual display device for the virtual machine to be a display device having the second resolution. For instance, the host system uses the second resolution to configure the virtual machine, an application executing on the virtual machine, or both.

In some implementations, the process 300 can include additional steps, fewer steps, or some of the steps can be divided into multiple steps. For example, the host system perform steps 302 through 312 and then repeat steps 304 through 312 for a second resolution of the content presentation area, e.g., in response to data indicating a change in size of the web browser window.

In some implementations, the host system may perform one or more of the steps in the process 300 for different types of clients. For example, the host system may perform the process 300 for a first client that does not include a web browser and uses a hardware decoder to present pixel information, for a second client that does not include a web browser and uses a hardware decoder to present pixel information, or both. In some examples, the host system may perform part of the process 300 for a client device that receive pixel information for presentation of a user interface of an application and perform another process to provide instructions to a different client device for presentation of a user interface, e.g., when the different client device uses a remote client application to access content from the host system.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
  receiving a request from a client device to initiate a remote session that enables remote interaction with one or more applications executing on a virtual machine by presenting display data for the one or more applications in a web browser executing on the client device;
  detecting, for the remote session, a first resolution for a content presentation area in the web browser in response to receiving the request to initiate the remote session that enables remote interaction with the one or more applications executing on the virtual machine by presenting display data for the one or more applications in a web browser executing on the client device;
  in response to detecting, for the remote session, the first resolution for the content presentation area in the web browser, generating, for the remote session and using the first resolution, i) one or more first canvas tags and ii) a first stream of pixels representative of a user interface for one of the one or more applications for presentation in the content presentation area in the web browser using the one or more first canvas tags;

providing, during the remote session and to the client device, i) the one or more first canvas tags and ii) the first stream of pixels for display in the web browser using the one or more first canvas tags;

receiving, for the remote session, input indicating a change to a resolution of the content presentation area in the web browser;

detecting, for the remote session, a second resolution for the content presentation area in the web browser of the client device in response to receiving the input indicating the change to a resolution of the content presentation area in the web browser;

in response to detecting, for the remote session, the second resolution for the content presentation area in the web browser, generating, for the remote session and using the second resolution, i) one or more second canvas tags and ii) a second stream of pixels representative of the user interface for the one of the one or more applications for presentation in the content presentation area in the web browser using the one or more second canvas tags; and providing, during the remote session and to the client device, i) the one or more second canvas tags and ii) the second stream of pixels for display in the web browser using the one or more second canvas tags.

2. The method of claim 1, comprising:
initiating the remote session with the client device; and
determining, by a host system during the remote session, that the client device does not include a remote client that can communicate with the host system, wherein generating, for the remote session and using the first resolution, the first stream of pixels representative of the user interface for the one of the one or more applications for presentation in the content presentation area in the web browser is responsive to determining that the client device does not include a remote client that can communicate with the host system.

3. The method of claim 1, comprising:
configuring, for the remote session, settings for a virtual display device for the virtual machine to be a display device having the first resolution, wherein generating, for the remote session and using the first resolution, i) the one or more first canvas tags and ii) the first stream of pixels representative of the user interface for one of the one or more applications for presentation in the content presentation area in the web browser using the one or more first canvas tags comprises generating, for the remote session and using the settings for the virtual display device, i) the one or more first canvas tags and ii) the first stream of pixels representative of the user interface for one of the one or more applications for presentation in the content presentation area in the web browser using the one or more first canvas tags.

4. The method of claim 1, comprising:
detecting, for the remote session, one or more input properties for an input device of the client device in response to receiving the request to initiate the remote session that enables remote interaction with the one or more applications executing on the virtual machine by presenting display data for the one or more applications in a web browser executing on the client device; and
configuring, for the remote session, settings for a virtual input device for the virtual machine to be an input device having the one or more input properties for the input device, wherein generating, for the remote session and using the first resolution, i) the one or more first canvas tags and ii) the first stream of pixels representative of the user interface for one of the one or more applications for presentation in the content presentation area in the web browser using the one or more first canvas tags comprises generating, for the remote session and using the settings for the virtual input device, i) the one or more first canvas tags and ii) the first stream of pixels representative of the user interface for one of the one or more applications for presentation in the content presentation area in the web browser using the one or more first canvas tags.

5. The method of claim 1, comprising:
receiving, from the web browser, data representing user input for the user interface of the one of the applications; and
providing, to the one of the applications, the data representing the user input.

6. The method of claim 5, wherein receiving the data representing the user input for the user interface of the one of the applications comprises receiving data using an application programming interface.

7. The method of claim 5, wherein receiving the data representing the user input for the user interface of the one of the applications comprises receiving data representing a string of input for the user interface of the one of the applications.

8. The method of claim 5, wherein receiving the data representing the user input for the user interface of the one of the applications comprises receiving data representing a copy and paste action that copied content outside of the presentation of the first stream of pixels on the client device and pasted the content into the presentation of the first stream of pixels.

9. A system comprising:
one or more computers configured to interact with a first client device and a second client device and to perform operations comprising:
receiving a first request to initiate a first remote session for the first client device that enables remote interaction with one or more applications executing on a virtual machine;
determining that the first client device does not include a remote client that can communicate with the system;
detecting, for the first remote session, a first resolution for a content presentation area on a display for the first client device in response to receiving the first request to initiate the first remote session that enables remote interaction with the one or more applications executing on the virtual machine;
in response to determining that the first client device does not include a remote client, generating, for the first remote session and using the first resolution, i) one or more first canvas tags and ii) a first stream of pixels representative of a user interface for one of the one or more applications for presentation in the content presentation area of the first client device using the one or more first canvas tags;
providing, during the first remote session and to the first client device, i) the one or more first canvas tags and ii) the first stream of pixels for display by the first client device in the content presentation area using the one or more first canvas tags;
detecting an end of the first remote session with the first client device;
detecting, for a second remote session for the second client device that enables remote interaction with the one or more applications executing on the virtual machine, a second resolution for a second content presentation area in a web browser executing on the second client device, the second client device being a different device from the first client device;

in response to detecting, for the second remote session, the second resolution for the second content presentation area in the web browser executing on the second client device, generating, for the second remote session and using the second resolution, i) one or more second canvas tags and ii) a second stream of pixels representative of the user interface for one of the one or more applications for presentation in the second content presentation area in the web browser using the one or more second canvas tags; and providing, during the second remote session and to the second client device, i) the one or more second canvas tags and ii) the second stream of pixels for display in the web browser by the second client device using the one or more second canvas tags.

10. The system of claim 9, wherein the one or more computers comprise a server operable to interact with the first device and the second device through a data communication network, and both the first client device and the second client device are configured to interact with the server as a client.

11. The system of claim 10, wherein the first client device comprises a mobile telephone or a tablet.

12. The system of claim 10, wherein the second client device does not include a remote client.

13. The system of claim 9, the operations comprising:
configuring, for the first remote session, settings for a virtual display device for the virtual machine to be a display device having the first resolution;
initiating the first remote session with the first client device in response to receiving the first request to initiate the first remote session for the first client device; and
configuring, for the second remote session, updated settings for the virtual display device for the virtual machine to be a display device having the second resolution, wherein:
generating, for the first remote session and using the first resolution, i) the one or more first canvas tags and ii) the first stream of pixels representative of a user interface for one of the one or more applications for presentation in the content presentation area of the first client device using the one or more first canvas tags comprises generating i) the one or more first canvas tags and ii) the first stream of pixels using the settings for the virtual display device;
providing, during the first remote session and to the first client device, i) the one or more first canvas tags and ii) the first stream of pixels for display by the first client device in the content presentation area using the one or more first canvas tags is responsive to initiating the first remote session with the first client device; and
generating, for the second remote session and using the second resolution, i) the one or more second canvas tags and ii) the second stream of pixels representative of the user interface for one of the one or more applications for presentation in the second content presentation area in the web browser using the one or more second canvas tags comprises generating i) the one or more second canvas tags and ii) the second stream of pixels using the updated settings for the virtual display device.

14. A non-transitory computer storage medium encoded with instructions that, when executed by one or more computers, cause the one or more computers to perform operations comprising:
receiving a first request to initiate a first remote session for a first client device that enables remote interaction with one or more applications executing on a virtual machine;
determining that the first client device does not include a remote client that can communicate with the one or more computers;
detecting, for the first remote session, a first resolution for a content presentation area on a display for the first client device in response to receiving the first request to initiate the first remote session that enables remote interaction with the one or more applications executing on the virtual machine;
in response to determining that the first client device does not include a remote client, generating, for the first remote session and using the first resolution, i) one or more first canvas tags and ii) a first stream of pixels representative of a user interface for one of the one or more applications for presentation in the content presentation area of the first client device using the one or more first canvas tags;
providing, during the first remote session and to the first client device, i) the one or more first canvas tags and ii) the first stream of pixels for display by the first client device in the content presentation area using the one or more first canvas tags;
detecting an end of the first remote session with the first client device;
detecting, for a second remote session for a second client device that enables remote interaction with the one or more applications executing on the virtual machine, a second resolution for a second content presentation area in a web browser executing on the second client device, the second client device being a different device from the first client device;
in response to detecting, for the second remote session, the second resolution for the second content presentation area in the web browser executing on the second client device, generating, for the second remote session and using the second resolution, i) one or more second canvas tags and ii) a second stream of pixels representative of the user interface for one of the one or more applications for presentation in the second content presentation area in the web browser using the one or more second canvas tags; and
providing, during the second remote session and to the second client device, i) the one or more second canvas tags and ii) the second stream of pixels for display in the web browser by the second client device using the one or more second canvas tags.

15. The computer storage medium of claim 14, the operations comprising:
configuring, for the first remote session, settings for a virtual display device for the virtual machine to be a display device having the first resolution;
initiating the first remote session with the first client device in response to receiving the first request to initiate the first remote session for the first client device; and
configuring, for the second remote session, updated settings for the virtual display device for the virtual machine to be a display device having the second resolution, wherein:

generating, for the first remote session and using the first resolution, i) the one or more first canvas tags and ii) the first stream of pixels representative of a user interface for one of the one or more applications for presentation in the content presentation area of the first client device using the one or more first canvas tags comprises generating i) the one or more first canvas tags and ii) the first stream of pixels using the settings for the virtual display device;

providing, during the first remote session and to the first client device, i) the one or more first canvas tags and ii) the first stream of pixels for display by the first client device in the content presentation area using the one or more first canvas tags is responsive to initiating the first remote session with the first client device; and generating, for the second remote session and using the second resolution, i) the one or more second canvas tags and ii) the second stream of pixels representative of the user interface for one of the one or more applications for presentation in the second content presentation area in the web browser using the one or more second canvas tags comprises generating i) the one or more second canvas tags and ii) the second stream of pixels using the updated settings for the virtual display device.

16. The computer storage medium of claim 14, the operations comprising:

detecting, for the first remote session, one or more first input properties for a first input device of the first client device;

configuring, for the first remote session, settings for a virtual input device for the virtual machine to be an input device having the one or more first input properties for the first input device of the first client device;

initiating the first remote session with the first client device in response to receiving the first request to initiate the first remote session for the first client device;

detecting, for the second remote session, one or more second input properties for a second input device of the second client device; and configuring, for the second remote session, updated settings for the virtual input device for the virtual machine to be an input device having the one or more second input properties for the second input device of the second client device, wherein:

generating, for the first remote session and using the first resolution, i) the one or more first canvas tags and ii) the first stream of pixels representative of a user interface for one of the one or more applications for presentation in the content presentation area of the first client device using the one or more first canvas tags comprises generating i) the one or more first canvas tags and ii) the first stream of pixels using the settings for the virtual input device;

providing, during the first remote session and to the first client device, i) the one or more first canvas tags and ii) the first stream of pixels for display by the first client device in the content presentation area using the one or more first canvas tags is responsive to initiating the first remote session with the first client device; and generating, for the second remote session and using the second resolution, i) the one or more second canvas tags and ii) the second stream of pixels representative of the user interface for one of the one or more applications for presentation in the second content presentation area in the web browser using the one or more second canvas tags comprises generating i) the one or more second canvas tags and ii) the second stream of pixels using the updated settings for the virtual input device.

17. A system comprising:

one or more computers and one or more storage devices storing instructions that are operable, when executed by the one or more computers, to cause the one or more computers to perform operations comprising:

receiving a request from a client device to initiate a remote session that enables remote interaction with one or more applications executing on a virtual machine by presenting display data for the one or more applications in a web browser executing on the client device;

detecting, for the remote session, a first resolution for a content presentation area in the web browser in response to receiving the request to initiate the remote session that enables remote interaction with the one or more applications executing on the virtual machine by presenting display data for the one or more applications in a web browser executing on the client device;

in response to detecting, for the remote session, the first resolution for the content presentation area in the web browser, generating, for the remote session and using the first resolution, i) one or more first canvas tags and ii) a first stream of pixels representative of a user interface for one of the one or more applications for presentation in the content presentation area in the web browser using the one or more first canvas tags;

providing, during the remote session and to the client device, i) the one or more first canvas tags and ii) the first stream of pixels for display in the web browser using the one or more first canvas tags;

receiving, for the remote session, input indicating a change to a resolution of the content presentation area in the web browser;

detecting, for the remote session, a second resolution for the content presentation area in the web browser of the client device in response to receiving the input indicating the change to a resolution of the content presentation area in the web browser;

in response to detecting, for the remote session, the second resolution for the content presentation area in the web browser, generating, for the remote session and using the second resolution, i) one or more second canvas tags and ii) a second stream of pixels representative of the user interface for the one of the one or more applications for presentation in the content presentation area in the web browser using the one or more second canvas tags; and providing, during the remote session and to the client device, i) the one or more second canvas tags and ii) the second stream of pixels for display in the web browser using the one or more second canvas tags.

18. The system of claim 17, the operations comprising:
initiating the remote session with the client device; and
determining, by a host system during the remote session, that the client device does not include a remote client that can communicate with the system, wherein generating, for the remote session and using the first resolution, the first stream of pixels representative of the user interface for the one of the one or more applications for presentation in the content presentation area in the web browser is responsive to determining that the client device does not include a remote client that can communicate with the host system.

19. The system of claim 17, the operations comprising: configuring, for the remote session, settings for a virtual display device for the virtual machine to be a display device having the first resolution, wherein generating, for the remote session and using the first resolution, i) the one or more first canvas tags and ii) the first stream of pixels representative of the user interface for one of the one or more applications for presentation in the content presentation area in the web browser using the one or more first canvas tags comprises generating, for the remote session and using the settings for the virtual display device, i) the one or more first canvas tags and ii) the first stream of pixels representative of the user interface for one of the one or more applications for presentation in the content presentation area in the web browser using the one or more first canvas tags.

20. The system of claim 17, the operations comprising: detecting, for the remote session, one or more input properties for an input device of the client device in response to receiving the request to initiate the remote session that enables remote interaction with the one or more applications executing on the virtual machine by presenting display data for the one or more applications in a web browser executing on the client device; and configuring, for the remote session, settings for a virtual input device for the virtual machine to be an input device having the one or more input properties for the input device, wherein generating, for the remote session and using the first resolution, i) the one or more first canvas tags and ii) the first stream of pixels representative of the user interface for one of the one or more applications for presentation in the content presentation area in the web browser using the one or more first canvas tags comprises generating, for the remote session and using the settings for the virtual input device, i) the one or more first canvas tags and ii) the first stream of pixels representative of the user interface for one of the one or more applications for presentation in the content presentation area in the web browser using the one or more first canvas tags.

\* \* \* \* \*